D. Vermillion.
Dredger.
Nº 3,818. Patented Nov. 9, 1844.
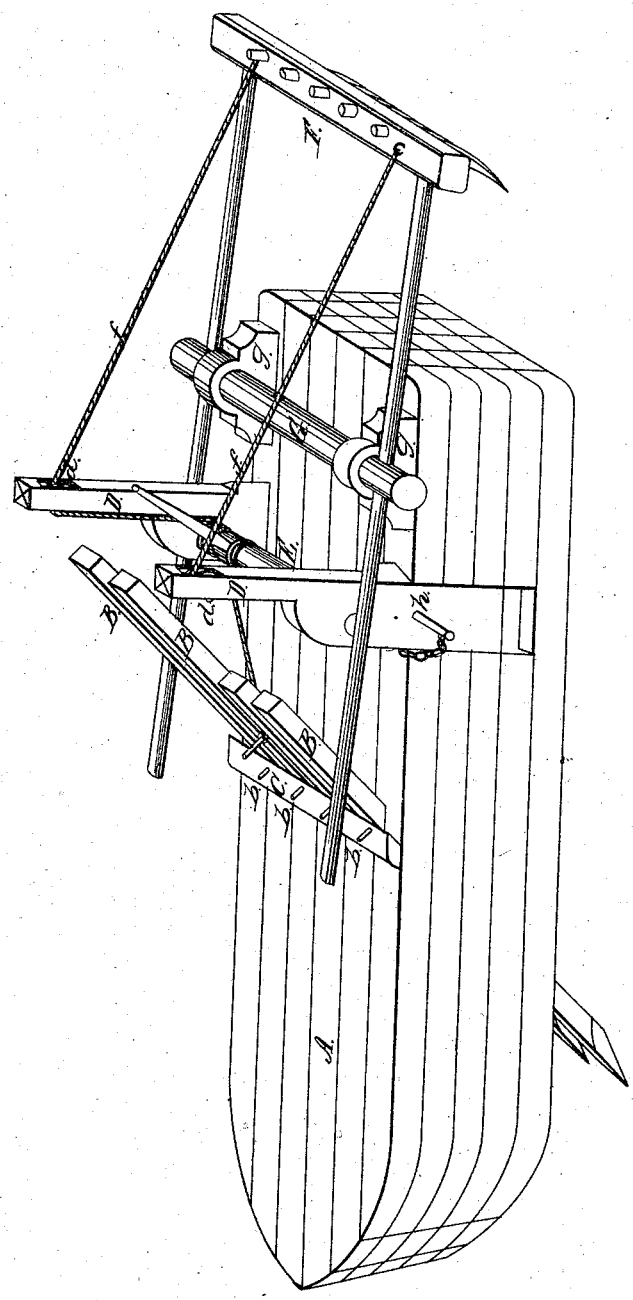

UNITED STATES PATENT OFFICE.

DENNIS VERMILLION, OF WASHINGTON, DISTRICT OF COLUMBIA.

EXCAVATOR OR DRAG FOR REMOVING MUD, SAND-BARS, SHOALS, &c., IN BEDS OF RIVERS.

Specification of Letters Patent No. 3,818, dated November 9, 1844.

*To all whom it may concern:*

Be it known that I, DENNIS VERMILLION, of Washington, District of Columbia, have invented a new and useful Apparatus for Removing Mud or Sand-Bars or Shoals or Any other Similar Obstructions to Navigation from the Beds of Rivers, &c.; and I do hereby declare that the following is a full, clear, and exact description of the construction and operation of the same, reference being had to the annexed drawing, making a part of this specification, and which represents the complete apparatus.

Construction: A series of courses of squared logs are, vertically as well as transversely, bolted together in such a manner as to form one solid bulk A. The respective outside logs are so shaped as to cause the bulk to resemble the hull of a vessel. From top to bottom, and near its center, this bulk is perforated by three, four, or more square mortises, which form an angle of about 45 degrees (more or less) with the horizon, as may be found most convenient. In these mortises are inserted corresponding timbers B of a convenient length. At their lower extremities these timbers assume a triangular shape, each presenting one of its edges in front to the obstacle to be removed, and they terminate in blunt points, furnished with iron shoes. Furthermore these timbers, which I denominate "breakers," are furnished at their upper ends with cylindrical perforations or holes, piercing them from their upper to their under side. These holes are for the reception of corresponding bolts $b$, which, after passing through holes in a cross-timber C, enter and secure the breakers. The cross timber C is fastened to the top of the main body, and directly in front of the breakers. The breakers are raised or lowered by means of a common lever, one end of which is inserted in the holes of said breakers, the cross piece C serving for a fulcrum. Directly back of the breakers, and on the sides of the hull are placed the standards or posts D. Between these is the horizontal windlass E, around which wind the chains or ropes $f$, by means of which the rake F, hereafter described, is raised and lowered. Said chains or ropes pass over pulleys $d$ inserted in the upper ends of the posts D. The rake F consists of the headpiece of wood, a number of iron prongs or teeth, and a long wooden handle on each side, inserted into the aforesaid headpiece. On the top and near the ends of the headpiece are attached the chains or ropes $f$. Near the stern, and on the top, of the main bulk A is placed transversely the oscillating cylinder G, properly mounted on the bearings $g$, beyond which on each side, the said cylinder extends. Each of these extensions has a cylindrical perforation or hole, through which the handles of the rake pass, and wherein they move. The standards or posts D are let in on the sides of the bulk in such a manner as to be raised or lowered, as circumstances may require, and are fastened by one or more bolts $h$.

Operation: The apparatus, having been thus constructed, is attached to any common steamboat. One or more additional layers of logs are added on the top, if the depth of the water should require it. For this purpose the posts D are made to slide up and down. The breakers B, by means of a common lever inserted in the holes are let down to the required depth for action, and fastened by the bolts $b$. This done, the steamboat starts, dragging the apparatus behind it, the breakers B breaking up the bars or shoals, and the current of the water carries off the sand, mud, or other obstacle thus torn up. If the current of the water should not prove powerful enough to carry off the sand, mud, etc., resort is had to the above described rake F, which is lowered by means of the windlass E and the chains or ropes $f$, to a sufficient extent for effective operation. This rake, following the apparatus as it moves along, will carry along the obstacles loosened by the preceding breakers.

The whole apparatus being mostly composed of wood, and but little iron, may be constructed at an expense comparatively trifling, timber being generally found in abundance in the neighborhood of those rivers and other waters, where the apparatus most likely is called for. The roughness of the construction will also add to the cheapness thereof.

What I claim as my invention and desire to secure by Letters Patent, is:

The combination of a bulk of squared logs, resembling the hull of a vessel, the adjustable breakers B, and the rake F with its oscillating cylinder G and windlass E, the whole forming an apparatus for removing sand—or mud—bars or shoals, or other similar obstruction to navigation, from the beds of rivers and other waters; said apparatus being (substantially) constructed, and operates as hereinabove described.

DENNIS VERMILLION.

Witnesses:
 RICH. H. STEWART,
 FRANCIS BEANE.